Nov. 16, 1971  F. H. MARZ  3,620,004
TIME INDICATING DEVICE OF DIRECT READ-OFF TYPE
Filed Sept. 25, 1969  2 Sheets-Sheet 1

INVENTOR
*Frank H. Marz*

By *[signature]*
ATTORNEY

Nov. 16, 1971  F. H. MARZ  3,620,004
TIME INDICATING DEVICE OF DIRECT READ-OFF TYPE
Filed Sept. 25, 1969  2 Sheets-Sheet 2
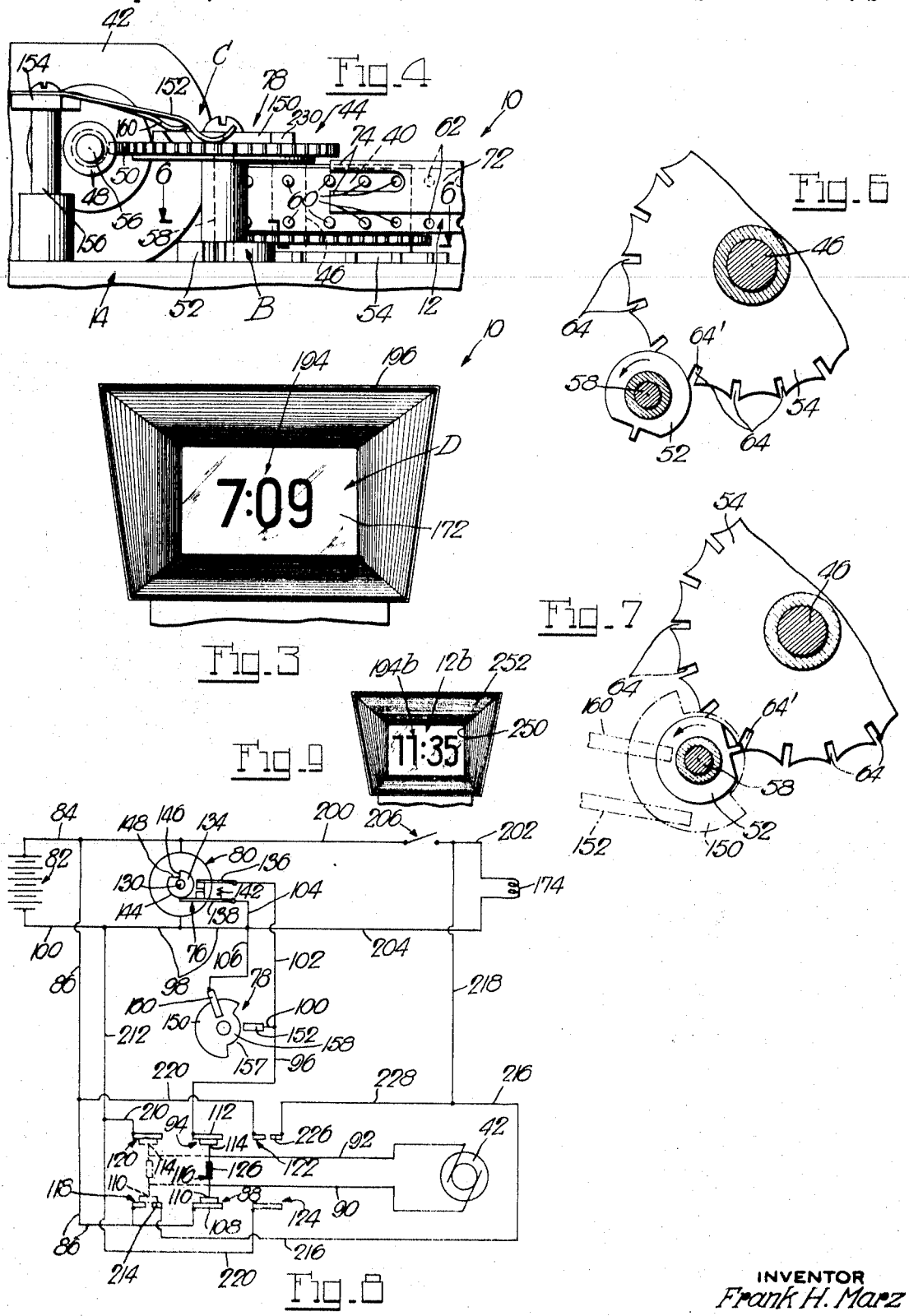
INVENTOR
Frank H. Marz
By
ATTORNEY United States Patent Office 3,620,004
Patented Nov. 16, 1971

3,620,004
TIME INDICATING DEVICE OF DIRECT READ-OFF TYPE
Frank H. Marz, Delavan, Wis., assignor to The Bunker-Ramo Corporation, Oak Brook, Ill.
Filed Sept. 25, 1969, Ser. No. 861,092
Int. Cl. G04c 3/00; G04b 19/30
U.S. Cl. 58—23
4 Claims

ABSTRACT OF THE DISCLOSURE

Device using film with successive frames bearing different indicia, and having means for step-by-step advancement of the film in synchronism with the passage of time, with successive frames pausing in register with a film gate for image projection of their indicia onto a screen, and the device having further provision for manually controlled rapid advance or retraction of the film.

This invention relates to time-indicating devices in general, and to time indicating devices of direct read-off type in particular.

The present invention is concerned especially, though not exclusively, with devices of the type in which time digits are provided on preferably endless tape in uniformly spaced units which indicate time in hours and minutes at predetermined recurring time intervals such as every minute, for example, and which cover a 12 or 24 hour span, and the tape is by time-driven mechanism advanced to bring successive digit units to a display station at which the time may be read at a glance, with the tape starting a new 12 or 24 hour time span with the expiration of each indicated time span.

It is among the objects of the present invention to provide a time-indicating device of this type in which successive time indications occur by periodically stepping tape or film, referred to collectively as "film," to bring successive digit unit frames thereof into full register, either with a display window for direct time indication thereat, or with a film gate for projection of successive digit units onto a screen, with each step of the film being so rapid as to be virtually unnoticable to the observer.

Another object of the present invention is to provide a time-indicating device of this type in which a film is periodically stepped as aforementioned, by providing film advancing mechanism having film feed and master control units, of which the film feed unit includes a film feed wheel in the preferred form of a film sprocket, a D.C. motor, Geneva gearing of which the driven wheel turns with the sprocket and the driver is driven by the motor, and a motor circuit control operated in timed relation with the Geneva driver to open the closed motor circuit after the driver has concluded an indexing step of the driven wheel and sprocket and before the same drivingly remeshes with the driven wheel for the next indexing step, and the master control unit is suitably powered, preferably electrically, and may be of any known type which delivers precisely at the conclusion of each time interval designated by successive digit units, such as once every minute, for example, an electric pulse to cause closure of the motor circuit. With this arrangement, step-by-step indexing of the film is and remains under the accurate time control of the master unit and the accuracy of time-keeping of the device is also equal to the time control accuracy of the master unit, while the motor circuit control in the film feed unit lacks any critical operating aspects and may easily and simply be arranged unfailingly to open and keep open the motor circuit after each complete indexing step of the film for a stop of the Geneva driver somewhere within its idle range from driving demesh from, to driving remesh with, the Geneva driven wheel. Further, with the master control unit merely delivering accurately timed pulses for operation of the time-indicating device, any number of such devices may serve as slave devices under unitary control of a single remote master control unit.

A further object of the present invention is to provide a time-indicating device of this type having film advance mechanism with the aforementioned film feed and master control units, of which the motor circuit control in the film feed unit is in the form of a holding switch in the motor circuit having companion contact plate and arm parts of which one part is turnable with the Geneva driver and the other part is fixed, and the master control unit delivers the aforementioned motor circuit closing pulse preferably by briefly closing, precisely at the conclusion of each time interval designated by successive digit units, a normally-open starting switch in the motor circuit which is connected in parallel with the holding switch, with the contact plate part of the holding switch being of an angular extent and coordinated with the arm part thereof and with the Geneva driver so that during each brief closure of the motor circuit by the starting switch the turning part of the holding switch will move into contact with the fixed part thereof while the Geneva driver still turns within its idle range, and then hold the motor circuit closed until opening the same after the Geneva driver has concluded an indexing step of the Geneva driven wheel, and more precisely at a point of the travel of the Geneva driver within its idle range at which the turning part of the holding switch will assuredly come to rest in a position out of engagement with its fixed companion part but within engaging reach of the latter on the next brief closure of the starting switch. With this arrangement, the motor will at the start of each film-indexing step or cycle be confronted only with the negligible load of the Geneva driver and therewith turning part of the holding switch and, hence, will be at full speed when assuming the major load of the Geneva-driven wheel and therewith turning film feed sprocket, with ensuing low power output requirement of the motor and rapid indexing of the film. Also, the contact plate and arm parts of the motor circuit holding switch are exceedingly simple parts of very low cost, and they are in their assembly easily coordinated within permissible relatively wide tolerances, with this switch nevertheless performing entirely reliably and accurately, especially since the master control unit is preferably arranged to close the circuit starting switch, while only briefly in each film-indexing cycle, nevertheless sufficiently long to overlap closure of the circuit holding switch on the start of the Geneva driver from any conceivable stop position in its idle range.

It is another object of the present invention to provide a time-indicating device of this type in which the motor drive of the Geneva driver is by way of a worm and worm gear of inherently relatively large gear ratio, with the worm gear of correspondingly large diameter being mounted on the shaft of the Geneva driver and affording a ready mount for the turning part of the holding switch at the level of the worm on the motor shaft. With this arrangement, the torque output requirement of the motor is further reduced to a very low minimum, and the turning part of the holding switch is preferably the contact plate part which, owing to the considerable diameter of the worm gear, may be of relatively large size for particular ease in mounting the same on the worm gear especially in proper coordination with the fixed contact arm part of the holding switch and with the Geneva driver. Further, and even though the worm gear, and with it the Geneva driver and contact plate of the holding switch, are driven at a speed lower than that of the motor, each film-indexing step is nevertheless sufficiently rapid to be virtually unnoticeable to an observer, particularly if the gear ratio between the Geneva driver and its companion driven wheel is preferably also relatively large.

It is a further object of the present invention to provide a time-indicating device of this type which may at any time be set in its time indication, by providing for manually controlled advance or backward motion of the film by the motor-powered film feed unit but without the circuit control functions of the starting and holding switches thereof. To this end, the film feed unit provides three circuits for the motor and a control switch unit therefor, of which a main circuit for motor forward drive includes the starting and holding switches and performs during normal operation of the time-indicating device, and the other two circuits are time-setting circuits for motor forward and reverse drive, while the control switch unit includes a switch component in each of these three circuits and a manual actuator normally urged into a position in which to close the switch component in the main circuit, and selectively shiftable from normal position to either of two time-setting positions in which to close the switch component in the respective time-setting circuit for closure of the latter and simultaneously open the switch component in the main circuit for opening the latter. With this arrangement, operation of the actuator to close either time-setting circuit will result in step-by-step response of the film in the chosen direction, with the film dwelling after each step for the brief interval during which the then continuously driven Geneva driver passes through its idle range. Further, each indexing step of the film will be exactly the same regardless of the drive direction of the Geneva driver, wherefore a film frame with a digit unit will between successive film steps in either direction, depending on the required time setting, dwell in exact register with a display window for direct observation of digit units thereat, or with a film gate for image projection of the digit units onto a screen. Moreover, with the change of each screen-projected image, for example, of the "time passing" in setting the time either forward or backward being caused by the periodic driving mesh of the Geneva driver with the driven wheel, the change of these images occurs at a readily comprehensible frequency which easily enables the one setting the time to release the actuator for opening the respective time-setting motor circuit in time for the Geneva driver to come to rest within its idle range, with ensuing exact register with the film gate of the film frame bearing the digit unit to which the time is set. However, even in the remote event that in time-setting the manual actuator should be released, timewise, so that the Geneva driver comes to rest while in driving mesh with the driven wheel, this is not really objectionable, for while the film frame with the digit unit to which the time is set will then be momentarily out of exact register with the film gate, the main circuit of the motor is then closed via the holding switch with ensuing immediate return of the film into full register stop relation with the film gate.

Another object of the present invention is to provide a time-indicating device of this type in which the time is indicated by screen-projected images of the digit units on successive film frames as they are stepped into register with the film gate, and there is provided, besides a main circuit for the projection light source, other circuit means therefor which are closed by the aforementioned manual actuator on its selective operation to close either time-setting circuit of the motor, so that the one seting the time may by the successive images on the screen observe the passing time, either forward or backward, to the desired time setting and thus be unfailingly guided to the correct time setting.

It is another object of the present invention to provide a time-indicating device of this type in which the projection screen is preferably provided with an overhanging light-shielding hood, whereby the time image projections on the screen, when called for, appear particularly clear to the observer, while at all other times the screen in the more or less dark background is sufficiently hidden from view to be substantially unnoticeable. Further, with the screen being thus hidden from view except when time indication is called for, the time-indicating device affords virtually unlimited possibilities for unique styling particularly, though not exclusively, in the vicinity of the "dial" which here is the projection screen.

Further objects and advantages will appear to those skilled in the art from the following, considered in conjunction with the accompanying drawings.

In the accompanying drawings, in which certain modes of carrying out the present invention are shown for illustrative purposes:

FIG. 3 is a front view of part of the time-indicating device as seen in the direction of the arrow 3 in FIG. 1;

FIG. 4 is an enlarged rear view of part of the time-indicating device as seen in the direction of the arrow 4 in FIG. 1;

FIG. 6 is a fragmentary section taken substantially on the line 6—6 of FIG. 4;

FIG. 7 is a section similar to FIG. 6, but showing certain parts of the device in a different operating position;

FIG. 8 is a wiring diagram of certain operating and control units of the time-indicating device; and FIG. 9 is a fragmentary front view of a time-indicating device embodying the invention in a modified manner.

Figure 1:
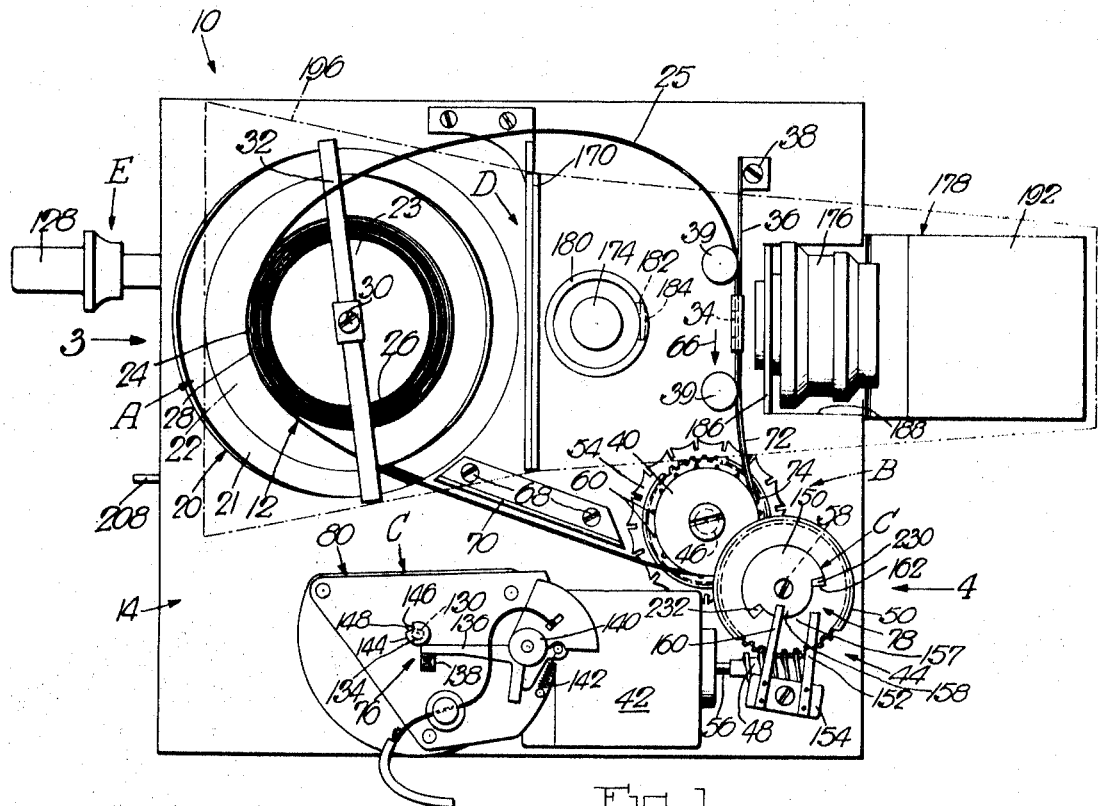
FIG. 1 is a top view of a time-indicating device embodying the present invention.

Referring to the drawings, and more particularly to FIGS. 1 to 4 thereof, the reference numeral 10 designates a time-indicating device or clock which indicates the time by readable digit units which change at predetermined time intervals to indicate the passage of time at these intervals. To this end, the time-indicating digit units are provided on a tape or film 12 which in this instance is endless and covers a time span of 12 or 24 hours. The clock has in this instance a base or chassis 14 on which are mounted the various operating components, such as an endless loop cartridge A for the film, film advancing mechanism B, time control C for mechanism B, provision D for visual time indication, and time-setting means E.

Figure 5:
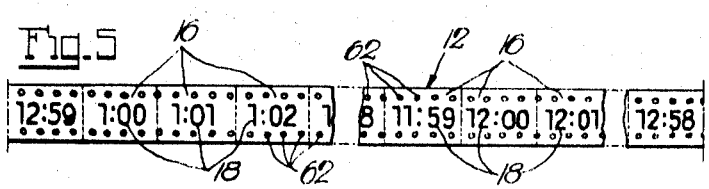
FIG. 5 is an enlarged view of a film used in the time-indicating device.

The endless film 12 (FIG. 5) has a multiplicity of successive equal-length frames 16 each of which bears a time-indicating digit unit 18, with successive digit units indicating the time at a given time interval apart. In the present instance, successive digit units 18 indicate the time at a preferred one-minute interval apart and the combined digit units cover an exemplary 12 hour span, in this instance from 12.01 via 1.00, 2.00 etc. to 12.00. The digit units 18 are suitably provided on the film, as by printing or photographic technique, for example. Of course, the film could be provided with progressive digit units to cover a 24 hour span, and could conceivably be provided with sufficient digit units and designation of the different months to cover a full year's time span.

ENDLESS LOOP CARTRIDGE A

The film 12 is stored in a conventional cartridge 20 having a dished support 21 and a freely revolving disc 22 with a center post 23, of which the support 21 is suitably mounted on the base 14. The film 12 is in the form of a multi-layer coil 24 with an endless loop 25 which leads from the innermost turn 26 and returns to the outermost turn 28 of the coil (FIG. 1). The film coil 24 is carried by the revolving disc 22 and wound on the center post 23 thereof. Mounted at 30 on the cartridge 20 is a conventional film release bar 32.

FILM ADVANCING MECHANISM B

The film 12 is advanced to bring successive frames 16 thereof into register with a film gate 34 on a bracket 36 which at 38 is mounted on the base 14. Projecting upwardly from the base 14 and extending on opposite sides of the film gate 34 are posts 39 which confine the film to a substantially straight path past the film gate. The film is in this instance intermittently moved in steps equal to the length of a frame 16 by a feed roll, and more particularly by a film sprocket 40, which is operated from a D.C. motor 42 through a drive connection 44. The film sprocket 40 is turnable on a cylindrical post 46 on the base 14, and the motor 42 is suitably mounted on the base 14. The drive connection 44 provides in this instance a worm 48 and therewith meshing worm gear 50, and a Geneva driver 52 and companion driven wheel 54, of which the worm 48 is carried by the motor shaft 56 and the worm gear 50 is turnable on a cylindrical post 58 on the base 14, while the Geneva driver 52 is also turnable on the post 58 in unison with the worm gear 50, and the driven wheel 54 is turnable on the post 46 in unison with the film sprocket 40. The film sprocket 40 has the usual teeth 60 for mesh with feed holes 62 in the film 12.

The motor 42 has a circuit which is periodically closed by the time control C with the Geneva driver 52 being on each periodic drive of the motor 42 driven from a start position like or similar to that shown in FIG. 6 anti-clockwise via the momentary position in FIG. 7 through one revolution, in the course of which the Genera driven wheel 54 is indexed through an angular distance equal to that between successive peripheral drive slots 64 therein, with ensuing intermittent advance of the film for one frame in the direction of the arrow 66 (FIG. 1), so that the film is on each step pulled past the film gate 34 as contemplated. Mounted at 68 on the base 14 is a film guide 70 (FIG. 1) which confines the film loop 25 to a substantially straight return path to the film coil 24 in the cartridge 20. Also, the bracket 36 has beyond the film gate 34 a resilient leaf extension 72 which bears with its end 74 against the film 12 to retain the same in driving mesh with the film sprocket 40 (FIGS. 1 and 4).

TIME CONTROL C

This control functions to close the motor circuit at the end of each actual time interval equal to that between the time indications of successive digit units 18 on the film, and to open the motor circuit after one revolution of the Geneva driver 52 from circuit closure. To this end, the control includes a starting switch 76 and a holding switch 78 in the motor circuit, and a master control unit 80 for operating the starting switch 76.

The motor circuit (FIG. 8) includes a battery 82, a lead 84 from one side of the battery, a lead 86, a normally-closed switch 88, a lead 90, the motor 42, a lead 92, a normally-closed switch 94, a lead 96, either of the starting and holding switches 76 and 78, and a lead 98 to the other side of the battery, with the starting and holding switches 76 and 78 being in the circuit connected between the leads 96 and 98 thereof in parallel with each other by leads 100 to 106. Accordingly, while the switches 88 and 94 are normally closed, the circuit is closed when either of the starting and holding switches 76 and 78 is closed or when both of these switches are closed.

Figure 2:
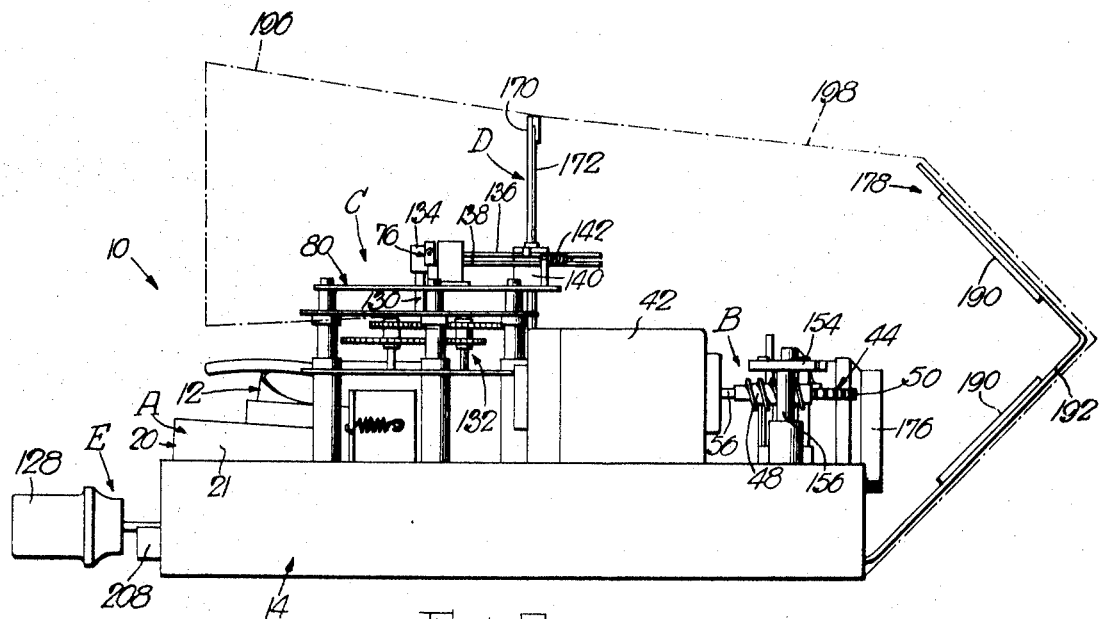
FIG. 2 is a side view of the time-indicating device.

The switches 88 and 94, while in series connection in the motor circuit, are paired and have companion fixed and movable contacts 108, 110 and 112, 114, respectively, of which the movable contacts 110 and 114 of both switches form part of a movable switch component 116 which is common to other paired switches 118, 120 and 122, 124 in time-setting motor circuits described hereinafter. To this end, the common switch component 116 provides an actuator 126 which carries the contacts 110 and 114 insulated from each other, and which is shiftable from closing relation with the paired switches 88, 94 (FIG. 8) into closing relation with either of the other paired switches 118, 120 or 122, 124, with the actuator 126 being for its shiftability provided with a handle in the exemplary form of a knob 128 (FIGS. 1 and 2). The switch component 116 is normally urged by suitable spring means (not shown) into a main position (FIG. 8) in which it closes the paired switches 88, 94 in the described motor circuit, hereinafter referred to as main circuit in distinction to the above-mentioned time-setting motor circuits.

The master control unit 80 is a timing unit which in this instance is powered from the same battery 82 (FIG. 8) and has a control shaft 130 which is driven at uniform speed and makes one complete revolution during each actual time interval equal to that between the time indications of successive digit units 18 on the film 12, this being a time interval of one minute in the present example. This timing unit, which is suitably mounted on the base 14, may be of any known type, and in this instance involves a conventional spring-driven and escapement-controlled movement 132 (FIG. 2), with the spring being by electromagnetic means (neither shown) rewound after each run-down to a preset low preload level. The control shaft 130 of this timing device, being in this instance a minute shaft, carries a cam 134 which actuates and controls the starting switch 76. Of course, the timing unit may be in the simple form of a synchronous A.C. motor with a suitable gear reduction from the output shaft of the motor to the control shaft, for applications where a commercial A.C. line is available.

The starting switch 76 provides in this instance fixed and movable companion contact blades 136 and 138 on a top post 140 on the timing unit 80 (FIGS. 1 and 2), of which the movable blade 138 is by a spring 142 urged into follower relation with the cam 134 and toward contact with its fixed companion blade 136 (see also FIG. 8). The cam 134 is in this instance a cylindrical body having in its periphery 144 a radial inward shoulder 146 and a return shoulder 148 to the periphery 144. Thus, with the cam 134 being driven clockwise (FIGS. 1 and 8), the movable contact blade 138 will be held out of contact with its fixed companion blade 136 while the former is in follower relation with the periphery 144 of the cam 134, but will be spring-snapped into contact with the fixed blade 136, and hence close the starting switch 76, when the inward shoulder 146 on the driven cam 134 aligns with and suddenly clears the movable blade 138, with the latter, however, being shortly thereafter moved out of contact with the fixed blade 136 by the passing return shoulder 148 on the cam to open the starting switch, as will be readily understood.

The holding switch 78 provides in this instance companion contact plate and arm parts 150 and 152, of which one of these parts is fixed and the other is driven in timed relation with the geneva driver 52. In the present instance, it is the contact plate 150 which is driven in timed relation with the geneva driver, with the contact plate 150 being to this end advantageously mounted on top of the worm gear 50 in insulated fashion, preferably by making the worm gear of insulating material. The fixed contact arm 152 is mounted on an insulating block 154 on an upright post 156 on the base 14 (FIGS. 1, 2 and 4), with this arm 152 being connected with the lead 100 (FIG. 8). The contact plate 150 is in the form of a sector of an included angle of preferably more than 180° with which the fixed arm 152 will be in contact during part of each revolution of this contact plate, with the fixed arm 152 being out of contact with the plate 150 for the remaining part of each revolution of the latter during which the arm 152 projects into the peripheral gap 157 in the plate. The contact plate 150 has an uninterrupted annular center portion 158 which in any angular position of the plate is in engagement with another fixed contact arm 160 which is also mounted on the insulating block 154 (FIG. 1) and electrically connects the contact plate with the lead 106 (FIG. 8).

In operation of the time-indicating device, the shaft 130 and with it the cam 134 of the master control unit 80 will be driven at the exemplary rate of one revolution per minute. Precisely at the passage of the cam 134 during each revolution thereof through the same momentary angular position, this being at the end of each complete minute of the actual time of day or night, the cam will permit spring-closure of the starting switch 76 and, hence, closure of the main motor circuit with ensuing start and running of the D.C. motor 42. At the time of closure of the main motor circuit by the starting switch 76, the geneva driver 52 is in an idle position like or similar to that shown in FIG. 6, and the holding switch 78 is open, with its contact plate 150 being then in an angular position like or similar to that shown in FIG. 1 in which the fixed contact arm 152 is within the gap 157 in the contact plate and rests against the top face of the insulating worm gear 50. When the motor 42 runs on closure of the starting switch 76, the Geneva driver 52 and the worm gear 50 with the contact plate 150 thereon are driven, anticlockwise as viewed in FIGS. 1 and 6, with the starting switch 76, and hence the main motor circuit, remaining closed at least until the holding switch 78 is closed, but being opened before the Geneva driver 52 comes into driving mesh with the nearest peripheral slot 64' in the driven wheel 54, with opening of the starting switch 76 being positive and under the control of the return shoulder 148 on the cam 134. Preferably, the cam 134 is arranged to open the starting switch 76 shortly after the holding switch 78 is closed so that the main motor circuit will remain closed on the shift from the starting switch to the holding switch. As the motor 42 continues the drive of the worm gear 50 and Geneva driver 52 after closure of the holding switch 78, the Geneva driver will come into driving mesh with the driven wheel 54 and step the latter and therewith turning film sprocket 40 clockwise (FIGS. 1 and 6) through a distance equal to that between successive drive slots 64 in the driven wheel 54, with ensuing advance of the film 12 to bring the next frame 16 thereof into center register with the film gate 34. The angular extent of the contact plate 150 of the holding switch 78 and its coordination with the contact arm 152 are such that this holding switch will remain closed while the Geneva driver 52 is in driving mesh with the driven wheel 54 (FIG. 7), and will open after the Geneva driver is out of driving mesh with the driven wheel and proceeds within its idle or non-driving range, with the holding switch being opened when the gap 157 in the contact plate 150 registers with the fixed contact arm 152. After opening of the main motor circuit on the described opening of the holding switch 78, the inertia of the motor-driven parts will carry the contact plate 150 to a stop position like or similar to that shown in FIG. 1 in which the same is with its trailing end 162 at some distance from the fixed contact arm 152. This intermittent indexing or stepping of the film 12 will be repeated for each revolution of the cam 134 of the master control unit 80.

PROVISION D FOR VISUAL TIME INDICATION

Mounted in an upright frame 170 on the base 14 is a screen 172 (FIGS. 2 and 3) on which to project the image of the time-indicating digit unit 18 on each film frame 16 when in register with the film gate 34. To this end, there is provided a projection light source in the form of an electric bulb 174, a lens unit 176, and an image reflector system 178. The bulb 174 is removably received in a suitable socket in the base 14 at one side of the film gate 34, and is surrounded by a cylindrical light shield 180 on the base 14, with this shield 180 having an aperture 182 in which a light-concentrating lens 184 is mounted. The lens unit 176 is suitably mounted at the opposite side of the film gate 34 in a bracket 186 which is conveniently struck from the base 14 as at 188 and bent upwardly. The image reflector system 178 involves two mirrors 190 which are mounted on the legs of an L-shaped bracket 192 on the base 14. There is also provided a circuit, including the battery 82, for the bulb 174. This circuit may remain closed so that light will emanate from the bulb 174 as long as the battery is alive. In any event, with the circuit of the bulb 174 closed and energized, light from the bulb will pass through the film frame 16 in register with the film gate 34, with the lens unit 176 producing an enlarged image of the digit unit on this film frame which through the reflector system 178 is cast onto the back of the screen 172 to be seen in front of the screen as the enlarged image 194 of the indicated time (FIG. 3) with this time indication being given in the present example as "7.09" which may be A.M. or P.M. if the film covers a 12 hour time span as in FIG. 5. Preferably, there is provided in front of the screen 172 an overhanging hood 196 which shields the screen from surrounding day or artificial light so that the time-indicating image 194 thereon will stand out sharply for ready reading even at a glance. Preferably also, another hood 198 extends from the screen 172 rearwardly to and over the reflector system 178 to shield all light from the bulb 174 from an observer's view.

The circuit of the bulb 174 includes, besides the battery 82, the lead 84 leads 200 and 202, bulb 174, a lead 204, leads 98 and 100, and in this instance also a normally-open switch 206 (FIG. 8). Accordingly, while successive film frames 16 will come into register with the film gate 34 in accurately timed sequence, the device will indicate time on the screen 172 only on demand by closing the switch 206. To this end, the switch 206 includes an actuator 208 (FIGS. 1 and 2) which for switch closure is depressible, for instance by a button in an ornamental front panel (neither shown) which would be provided if the present time-indicating device is used as an autoclock in the dashboard or some other place in an automobile. Of course, the present device may be used as a suitably encased household or any other purpose clock.

Each intermittent indexing step of the film 12 is desirably very quick, so as to prolong the dwell of a time image on the screen as much as possible, and, even more important, to replace a time image on the screen with the next time image in such an exceedingly short time interval as to be virtually unnoticeable to an observer. In this connection, the device lends itself to reliable stepping of the film one frame at a time during a fraction of a second, for example four-tenths of a second. That is so because despite the interent large gear ratio of the worm and worm gear 48 and 50, the relatively high running speed of the D.C. motor 42 will, nevertheless, result in reasonable high speed of the driven worm gear and geneva driver, and it is only during a relatively small part, in this example somewhat less than 90°, of each revolution of the geneva driver 52 that the driven wheel 54 and with it the film sprocket 40 and the film 12 are indexed (FIG. 7). In this connection also, the cam 134 on the control shaft 130 of the master control unit will, despite the relatively slow drive of this shaft 130 of exemplary 1 r.p.m., readily lend itself to the end of reliable intermittent quick-stepping of the film, for it is quite easy to arrange the active shoulder parts 146 and 148 of the cam 134 for snap-closure of the starting switch 76 at the exact recurring times and to hold this switch closed until after the holding switch 78 is closed but to open it before this holding switch is opened.

TIME SETTING MEANS E

For the purpose of setting the time of the device, there are provided the aforementioned time-setting circuits for selective and manually controlled forward and reverse drive of the motor 42, whichever drive direction is required for a particular time setting. One of these time-setting circuits, in this instance for forward drive of the motor 42 as required for setting the time ahead, includes the battery 82, leads 94 and 86, switch 118 when closed by the contact 110 of the common switch component 116 in dotted lines (FIG. 8), lead 90, motor 42, lead 92, switch 120 which is then closed by the other contact 114 of the switch component 116, leads 210 and 212, and lead 100. Accordingly, on shifting the common switch component 116 from the normal full-line position into the dotted-line position in FIG. 8 at the knob 128 (FIGS. 1 and 2), this particular time-setting circuit will be closed and the main motor circuit simultaneously opened, with the result that the motor will continuously be driven in forward direction as long as the switch component 116 is held in its dotted-line position against spring-return to its normal full-line position (FIG. 8). With the motor 42 being thus continuously driven in forward direction, the also continuously driven geneva driver 52 will during part of each revolution thereof index the driven wheel 54 and film sprocket for a one-frame advance of the film in normal forward direction as indicated by the arrow 66 in FIG. 1, whereby successive film frames 16 come to center-register stops with the film gate 34, and each film frame is at the film gate replaced by the next film frame as quickly as described earlier in normal operation of the device so as to be virtually unnoticeable to the observer.

To allow for ready control over the time-setting of the device ahead to any required extent, the one setting the time must be able to observe the indicated "passing" time on the screen in order to stop the time setting with the indicated time on the screen which corresponds to the exact time of day or night. To this end, provisions are made continuously to project onto the screen the images of the digit units on the film which are in successive register with the film gate 34 during a time setting cycle. For this purpose the bulb 174 has another circuit (FIG. 8) which is closed while the described time-setting motor circuit is closed, with this other circuit including the battery 82, leads 84 and 86, the then closed switch 118, a fixed contact 214 then in engagement with the contact 110 of the switch component 116, leads 216 and 218, lead 202, bulb 174, and leads 204, 98 and 100.

In time-setting the device ahead in this fashion, each "passing time" image on the screen will, during continuous drive of the Geneva driver 52, dwell on the screen briefly but nevertheless sufficiently long to be readily readable by the one setting the device and thus afford a ready guide toward correct time setting. Also, with each change on the screen from one "passing time" image to the next during time setting being not only sudden but also occurring at a readily perceptible frequency, this will make it quite easy for the one setting the time to release the knob 128 for spring-return of the switch component 116 to its normal full-line position (FIG. 8) in time within a comprehensible span to bring the film to rest with the time image to which the time is set being centered on the screen. It is also entirely feasible, and it may be preferred by some, to set the time by jogging the knob 128 for readily controlled advance of the film through one step for each jog. However, even in the remote event of releasing the knob 128 in forward time-setting position, timewise, so that the film will come to rest while the Geneva driver 52 is in driving mesh with the driven wheel 54, i.e., before the film is advanced a normal full step, this is not really objectionable because on the quick spring-return of the switch component 116 to its normal full-line position (FIG. 8), the main motor circuit is immediately closed via the then closed holding switch 78 under the circumstances, so that the first advance of the film after time setting is for the rest of the normal full step which was started, but not completed, in the final time-setting phase, wherefore even under these circumstances the first readable time image after time setting will be centered on the screen.

If the indicated time is to be set back, recourse is had to the other time-setting circuit for reverse drive of the motor 42, with this circuit including the battery 82, leads 84 and 86, a lead 220, switch 122, lead 92, motor 42, lead 90, switch 124, lead 222, and leads 212 and 100. Thus, on shifting the common switch component 116 at the knob 128 to close the switches 122 and 124 (FIG. 8), the motor 42 will be driven in the reverse direction with ensuing drive of the motor-driven parts to effect during part of each revolution of the Geneva driver 52 one step of the film, but this time in a direction opposite to the arrow 66 in FIG. 1, as will be readily understood.

In thus setting the indicated time back, the images of the "passing time," backward this time, are also cast onto the screen. To this end, there is provided still another circuit for the bulb 174 which is closed when the time-setting circuit for reverse motor drive is closed, with this other circuit including the battery 82, leads 84, 86 and 220, the then closed switch 122, a contact 226 then in engagement with the contact 114 of the switch component 116, a lead 228, leads 218 and 202, bulb 174, and leads 204, 98 and 100.

Setting the indicated time back proceeds in the same fashion described in connection with setting the indicated time ahead, except that the film 12 is stepped backward, as will be readily understood. Also, since in setting the indicated time back, the worm gear 50 and thereby carried contact plate 150 of the holding switch 78 are driven clockwise (FIG. 1) so that the end 162 of this contact plate is then the drivewise leading end thereof, this end 162 of the contact plate is preferably inclined at 230 up to the top face thereof (FIGS. 1 and 4) for smooth passage of the fixed contact arm 152 onto the contact plate 150. Preferably also, the other end 232 of the contact plate 150 is similarly inclined.

While in the described time-indicating device 10 the images of the digit units on the film are projected onto a screen for thus indicating the time to an observer, it is, of course, fully within the purview of the present invention to forego time image projection onto a screen and, instead, provide for reading the time directly from the digit units on a tape or film 12b as they brought into successive register with a display window 250 (FIG. 9). To this end, a suitable tape 12b other than film may bear the digit units 194b in legible manner, including adequate size to that end. In this instance, however, film 10b bears opaque digit units 194b, and provision is made for back illumination of the film so that any opaque digit unit in register with the display window 250 may clearly be read by the observer, particularly since there is preferably provided at the display window 250 an overhanging hood 252 which shields the window from extraneous day or artificial light.

Finally, while the device has been described as functioning to indicate the time, i.e., serve as a clock, it is, of course, fully within the ambit of the present invention to apply it for periodically displaying matter other than time, such as teaching matter, for example.

What is claimed is:

1. Apparatus for selectively displaying digital representations of the time of day at a display area, said apparatus comprising a film-strip including a multiplicity of successive frames of similar size, shape and proportions with each of said frames carrying a plurality of numerical digits representing time reading, with the digits appearing on adjacent frames of the film-strip being in regular numerical sequence and representing a fixed time interval between the digital reading on any frame and the readings on the frames on either side thereof, so that the entire film-strip is adapted to display, in sequence, digital readings of each hour and minute of the day, means for intermittently advancing said film-strip in step-by-step motion of one frame at a time, with intervals of rest between each of said steps, said advancing means including a driving motor having a rotating shaft, a worm on said shaft, a worm gear actuated by said worm, film-engaging means driven by said worm gear, and control circuitry for said motor including contact-making means driven by said worm gear, having contacts spaced to maintain said motor in operation after it is initially actuated by a momentary starting pulse from external timing means, to maintain said operation until said film-strip has been fully advanced one step, and to interrupt said operation after said full advance has been completed, and before said worm gear has reached a point effecting further advance of said film-strip.

2. The apparatus of claim 1 in which the means for supplying starting pulses to the motor consists of a clockwork mechanism adapted to close a pair of electrical contacts at pre-determined fixed time intervals.

3. The apparatus of claim 1 wherein the control circuitry includes manual switch means effective to override the contact-making means whereby the motor may be caused to run continuously to set the film-strip to the correct time.

4. The apparatus of claim 1 in which a Geneva movement is driven by the worm gear and the film strip is advanced by a sprocket on the output of said Geneva movement; with the contact-making means for the driving motor positioned to stop the motor only with the Geneva movement in its idle range of movement.

References Cited

UNITED STATES PATENTS 2,652,745   9/1953   Quinn _____ 58—23 X
1,667,210   4/1928   Leon _____ 58—50

RICHARD B. WILKINSON, Primary Examiner

E. C. SIMMONS, Assistant Examiner

U.S. Cl. X.R.

58—50